Dec. 16, 1958 R. N. EICHORN 2,864,277

WEB CARD STOCK INSPECTION APPARATUS

Filed Dec. 16, 1954 2 Sheets-Sheet 1

INVENTOR.
ROBERT N. EICHORN
BY
ATTORNEY

Dec. 16, 1958 R. N. EICHORN 2,864,277

WEB CARD STOCK INSPECTION APPARATUS

Filed Dec. 16, 1954 2 Sheets-Sheet 2

INVENTOR.
ROBERT N. EICHORN

BY [signature]

ATTORNEY

United States Patent Office 2,864,277

Patented Dec. 16, 1958

2,864,277

WEB CARD STOCK INSPECTION APPARATUS

Robert N. Eichorn, Endicott, N. Y., assignor to International Business Machines Corporation, New York, N. Y., a corporation of New York Application December 16, 1954, Serial No. 475,732

7 Claims. (Cl. 88—14)

This invention relates to an apparatus for detecting and reporting imperfections in tabulating card stock and more particularly to passing a light across card stock to detect imperfections.

The web stock for tabulating cards contains imperfections within the card stock which must be detected and noted, so that the resultant cards can be discarded. The web stock for tabulating cards is made up in the form of a strip of considerable length, generally stored in rolled condition for convenience. Prior to feeding this stock to a printing and card making operation, it is important to detect imperfections in the stock, such as slime spots. These imperfections within the card stock are the result of faults or inclusions of foreign waterial in the manufacture of the stock material. In an apparatus for detecting imperfections in card stock by a photo-sensitive means activated by a spot of light sweeping across the surface of the card stock, difficulty has been encountered in effectively perceiving imperfections in the card stock immediately adjacent the lateral edges of the card stock.

It is an object of this invention to provide an apparatus for detecting imperfections in the stock for tabulating cards.

It is another object of this invention to provide an apparatus which surveys the web stock for tabulating cards and detects and reports surface imperfections in the stock.

Still another object of this invention is to provide an apparatus in which the detection of imperfections in web stock by a scanning light and a photosensitive device detects imperfections closely adjacent to the edge of the web stock.

It is still another object of this invention to provide a photosensitive device for detecting imperfections in tabulating card stock, and a means for varying the time of the photosensitive response immediately adjacent the edge of the web stock.

These and other objects of this invention will become more apparent upon consideration of the following description taken together with the accompanying drawings in which.

In general, this invention provides a means for apparently increasing time during which a sensitizing spot of light crosses areas immediately adjacent the lateral edges of tabulating card web stock which is being scanned by said sensitizing light to detect imperfections in the web stock. The sensitizing light is reflected from the surface of the web stock to a photosensitive device, such as a photo-multiplier tube, and the signal from the photo-multiplier is employed to indicate the presence of imperfections in the card stock. By this invention, imperfections which occur immediately adjacent the lateral edges of the card stock are detected and reported as surely and clearly as imperfections more removed from the edge.

Figure 1:
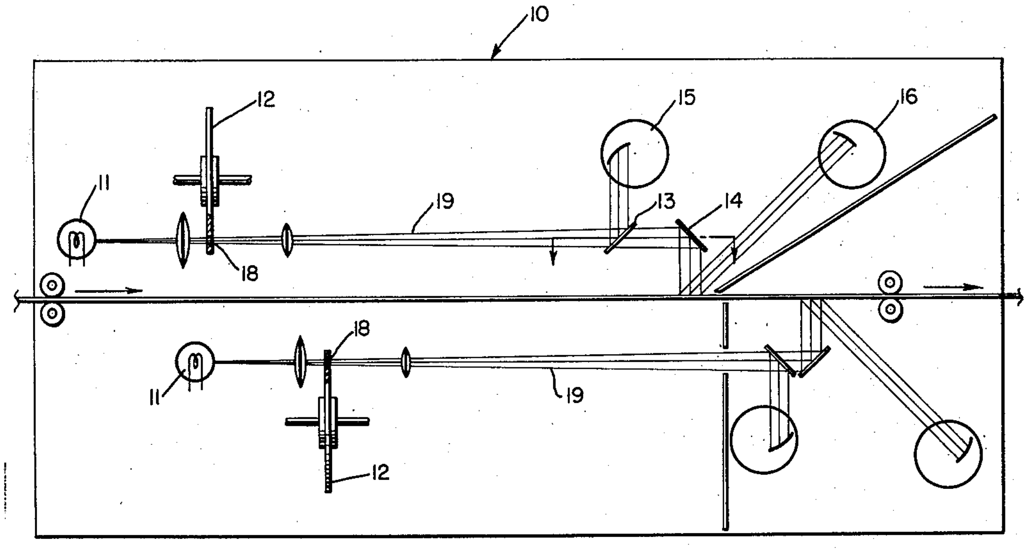
Figure 1 is a side elevational view of the photo-optical apparatus of the device of this invention.

Referring specifically to the figures, the photo-optical apparatus 10 of this invention, shown in Fig. 1, is made up of two identical systems consisting essentially of a source of light 11 and a rotatable aperture disc 12, reflecting mirrors 13 and 14 and photo-multiplier tubes 15 and 16. The system in the upper half of the apparatus 10 is provided for the scanning and detection of the upper surface of a web 17 of card stock. The system in the lower half of the apparatus 10 is provided for scanning the nether surface of the web 17. As the two systems are essentially identical, this description will refer to the upper system.

Figure 2:
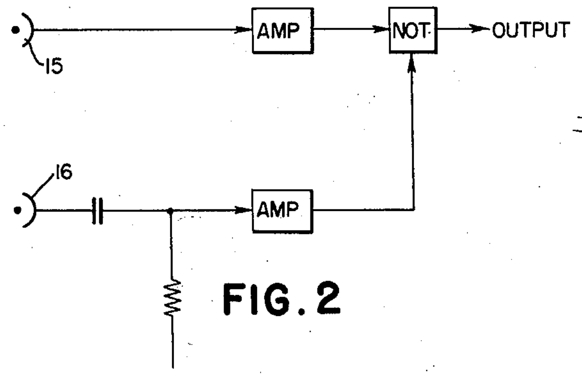
Fig. 2 is a schematic diagram of circuits showing for amplifying and matching of the signal obtained from a photo-multiplier tube of the apparatus of Fig. 1.

The light source 11 emits a beam 19 which, when passing through an aperture 18 in the disc 12, impinges on the main mirror 14 and is obliquely reflected downward on to the upper surface of the web 17. The light is reflected by the relatively light colored reflecting surface of the web 17 and is received in the main photo-multiplier 16. The photo-multiplier tube 16 may be a 931A tube. The signal produced by the activation of the photo-multiplier tube by light beam 19 is amplified within the tube to produce an appreciable signal, as shown in Fig. 2. The output from the photo-multiplier tube 16 is differentiated through a capacitance circuit and is further amplified and introduced into a not circuit, the output of which is recorded to indicate the condition of the surface or the web stock.

Figure 3:
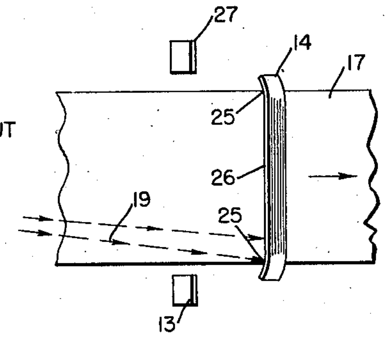
Fig. 3 is a schematic showing of the arrangement of one set of reflecting mirrors in the apparatus of Fig. 1.

In Fig. 3, the top view shows the relative lateral positioning of the main mirror 14 and the blanking mirror 13. On the opposite side of the web 17, a shield 27 is positioned to receive the beam 19 after it has passed off of the mirror 14. The blanking mirror 13 is positioned lateral to the web 17 and the main mirror 14 to catch the light beam 19 as it passes laterally across the edge of the web 17. The lateral blanking mirror 13 is positioned so that the beam 19 is not reflected from the mirror 14 to the surface of the web 17 and thence to the photo-multiplier tube 16 for a short portion of its lateral travel at the edge of the web 17. The beam 19 is reflected from the blanking mirror 13 to the photo-multiplier tube 15, which receives the activation of the light beam and amplifies the resultant signal to produce an output, as shown in Fig. 2. The signal output is amplified and fed into the not circuit of Fig. 2. The light beam 19 is swept across the web 17 by the rotation of the disc 12 and the consequent lateral motion of the aperture 18. The disc 12 has formed therein a number of apertures, one suitable form of the disc 12 being a 27 hole disc having a 3" diameter. The light beam 19 formed by each of the apertures 18 thus scans one norrow strip of the web 17 from one lateral edge to the other. Each successive light beam 19 formed by each successive aperture 18 scans a contiguous area of the web 17 with respect to the areas scanned by its immediately preceding and immediately following light beams 19. The light source 11 and the disc 12 thus are seen to form a succession of sweeping dots of light, which are reflected from the mirror 14 on to the web 17 and as the web 17 is moved through the apparatus 10 for inspection, the succession of light beams 19 sweep the surface of the web and collectively scan the entire surface.

The imperfections, discolorations and slime spots, which are detected by the reflection of the light beam 19 into the photo-multiplier tube 16 and the decrease of the resultant signal, cause a variation in the output signal from the not circuit due to their different reflectivity. These undesirable spots, which are detected by the device of this invention, are darker or lighter in reflectivity than the acceptable card stock. For example, there may be a light spot on dark colored card stock, or vice versa. Either spot should be detected. Consequently, an imperfection is reflected in the photo-multiplier tube 16 and the amplified output has a decrease or increase in output.

Figure 5:
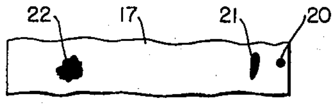
Fig. 5 is a plan view of a section of card stock showing three imperfections.
Figure 6:
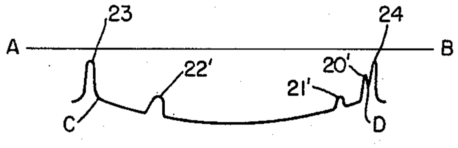
Fig. 6 is a profile of a voltage signal output of a photo-multiplier tube in a web inspection system operated without benefit of the invention herein.
Figure 7:
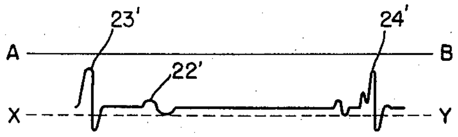
Fig. 7 is a graph showing the differentiated signal of the photo-multiplier output of Fig. 6.

In Fig. 5, the web 17 is shown with three characteristic imperfections 20, 21 and 22. The imperfection 20 is a slime spot immediately adjacent the right edge of the web 17. The imperfection 21 is an elongated area further removed from the edge. The imperfection 22 is a large slime spot. Fig. 6 is a profile of the voltage signal output from the photo-multiplier tube as produced by scanning the section of web 17, shown in Fig. 5, without the benefit of the device of this invention. Fig. 7 is the differentiated signal of the photo-multiplier tube 16 without the benefit of the device of this invention. The signal is differentiated in a capacitance circuit as shown in Fig. 2. A line A, B indicates a reference line of total darkness so that the pulses appearing in the profile indicate dark spots in the detected reflectivity by the beam which is shining on the photo-multiplier tube producing the voltage profile.

Two large pulses 23 and 24 are shown at the respective ends of the profile, as shown in Fig. 6. These pulses each represent the effect of the passage of the scanning beam 19 from the blanking mirror 13 to the main mirror 14 at the edge of the web 17 and indicate the lack of reflection of the beam 19 by the web 17 before the beam 19 impinges on the web. They are provided as reference pulses. The pulses 23 and 24 represent the decrease in the output of the photo-multiplier tube 16 when no light is incident on the web 17. The central section of the profile from C to D indicates the voltage of the photo-multiplier tube 16 as the light beam 19 proceeds across the web 17. The relative heights of the pulses 23 and 24 are proportional to the difference between the output voltage when the beam is reflecting from good areas of the web and the total darkness of the reference line A, B. The pulses 20′, 21′ and 22′ are a function of the contrast between the imperfection and the background, i. e., the good card stock. Both pulses 23 and 24 are the result of the light beam 19 passing the edge of the web 17 in successive scan trips. The two pulses 23 and 24 indicate that one spot of light formed by the apertured disc 12 follows immediately upon the other. Thus, the profile of the output from the photo-multiplier tube 16 is continuously formed by the constantly scanning beam 19.

It will be seen that the pulse 20′, as shown in Fig. 6, is lost in the voltage response of the adjacent pulse 24, as shown in Fig. 6. The pulse 24 changes the voltage of the signal output so substantially that it is not returned to normal by the time the photo-multiplier tube 16 is responding to the information of the imperfection 20, which is reflected in the pulse 20′. As a result, the voltage level does not return to normal before the information of the pulse 20′ is incorporated in the signal output. The light beam 19 in scanning the web 17 covers a narrow, laterally extending, strip of the web 17 with each lateral scan.

The imperfections 20, 21 and 22, shown in Fig. 5, are detected by the scan trip of the light beam which is associated with the reference pulse 24. It will be understood that the reference pulse 23 relates to the next succeeding scan trip over the contiguous following area of the web 17.

Figure 4:
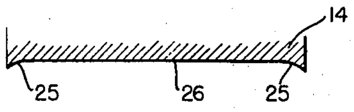
Fig. 4 is a sectional view showing the profile of the main reflecting mirror of the apparatus.

Reference is now made to Figs. 1, 2 and 3. In the apparatus 10 of this invention, the mirror 14 is provided with a concave arcuate sector 25 adjacent each of its respective ends, as shown in Figs. 3 and 4. Between these blanking arcuate sectors 25, the mirror 14 is shown by the profile of the mirror 14. The light beam 19 in traversing the mirror 14 passes first across one arcuate sector 25 then across the intermediate flat area 26 and finally across the other arcuate sector 25. From these sectors 25 and area 26, the beam 19 is reflected on to the surface of the web 17 and from the surface of the web 17 it is reflected into the photo-multiplier tube 16 which it activates. When the beam 19 moves across the arcuate sectors 25, it proceeds in a direction lateral to the direction of movement of the web 17. When the beam 19 moves across the area 26, it also moves laterally of the length and movement of the direction of the web 17. The rate of movement, however, lateral to the direction of movement of the web 17, is different for the traversing of the sectors 25 and traversing of the flat area 26. Because of the arcuate nature of sectors 25, the beam 19 in moving across these surfaces moves laterally to the web 17 at a slower rate than in its lateral movement across the intermediate flat area 26. As a result, the spot of light on the surface of the web 17 formed by the reflection from the mirror 14 moves relatively slowly in the areas adjacent the web edges and somewhat faster in the intermediate area central of the web 17. The result of this deflection of the beam 19 and delay in the period for traversing the areas adjacent the edges of the web 17 causes an apparent extension of the lateral edges of the web 17. This apparent extension is reflected in the signal output from the not circuit.

Figure 8:
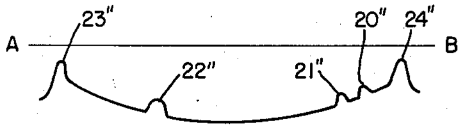
Fig. 8 is a graph showing the profile of a signal output of the photo-multiplier tube as sensitized by the light in the apparatus of this invention.

The profile of the signal voltage output of the photo-multiplier tube 16 according to this invention is shown in Fig. 8. This output is the result of the effect of the mirror 14 on the pulses in the signal voltage output. Pulses 23″ and 24″ are formed adjacent the ends of the profile of the signal voltage output as illustrated. The pulses 23″ and 24″ correspond to the pulses 23 and 24, shown in the profiles of Figs. 6 and 7 and, therefore, represent a decrease in output of the photomultiplier tube 16 when no light is incident on the web 17. Assuming that the beam 19 in creating the voltage on tube 16 for the profile of Fig. 8 scans the section of web 17 shown in Fig. 5, the profile shown in Fig. 8 will be produced by the resultant activation and lack of activation of the tube 16. The pulses 20″, 21″ and 22″, shown in the profile of Fig. 8, are the result of the decrease of output when the beam 19 passes over their respective imperfections 20, 21 and 22 of the web 17.

Figure 9:
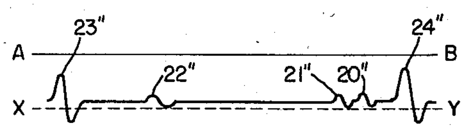
Fig. 9 is a graph showing the profile of the differentiated signal output of Fig. 8.

In Fig. 9 is shown a profile of the differentiated signal resulting from the photo-multiplier tube 16 output of Fig. 8. In Fig. 9, as in Fig. 7, the XY axis represents a bias level, while the AB axis represents a reference line of total darkness with respect to the variations in voltage output as reflecting the contrast between lightness and darkness indicated and reported by the effect of the light beam 19 on the photo-multiplier tube 16. The pulses 23″ and 24″ are relatively large in proportion to the pulses 20″, 21″ and 22″. This indicates the relationship between the effect of the decrease in output when no light is incident on the web 17, illustrated as pulses 23″ and 24″, and the decrease in output of the photo-multiplier tube 16 when light is incident on the imperfections 20, 21 and 22, illustrated as pulses 20″, 21″ and 22″.

The voltage signal output profiles of Figs. 6, 7, 8 and 9 are aligned in the accompanying drawings to show the relative lateral positioning of the various pulses depicted on these profiles. Considering the lateral displacement of the various pulses on the profiles, it will be seen that the pulses 23″ and 24″ are laterally displaced further from the center of the profiles of Figs. 8 and 9 than are the pulses 23 and 24 from the center of the profiles of Figs. 6 and 7. The large pulses 23″ and 24″ are apparently moved respectively to the left and to the right from the center of the profiles of Figs. 8 and 9. These result in a better resolution of the information reported immediately adjacent the lateral edges of the web 17. The spacing between the pulse 20″ which is most adjacent the pulse 24″ is much greater than the spacing between pulse 20′ and the pulse 24 of Figs. 6 and 7. This greater spacing permits the voltage level between the large pulse 24″ and the relatively small pulse 20′ to achieve a normal level with respect to the bias level XY. Thus, the separation of these pulses 24″ and 20″ can be detected. The detection and reporting of the other pulses on the profile is also shown in Figs. 8 and 9. These pulses are substantially the same in spacing as the pulses 21′ and 22′ of Figs. 6 and 7. The variation in spacing of the pulses is limited to the section of the voltage output profile which corresponds to the sectors 25 scanned by the light beam 19. It will be seen that the time delay introduced in the scanning operation by the arcuate sectors 25 provides for better resolution of the pulses produced on the signal voltage output profiles from the photo-multiplier tube 16.

The "not" circuit referred to above in the schematic diagram illustrated in Fig. 2 is used for the purpose of gating the desired signal output. This circuit has two inputs. One input is the output of the photo-multiplier tube 16 while the other input is the output of the photo-multiplier tube 15. The "not" circuit has the logical property such that if the input thereto from the photo-multiplier tube 15 is negative, indicating that the light beam has been reflected to impinge on photo-multiplier tube 15, no output is obtained from the "not" circuit. However, if photo-multiplier tube 15 does not see any light, then the output from photo-multiplier tube 16 may pass through the "not" circuit. This circuit may also be considered as a coincidence circuit where positive pulse inputs are required in order to obtain an output. The device may be a pentagrid switch tube having the usual power supply, and including first and second control grids which receive the outputs of photo-multiplier tubes 15 and 16, respectively. A negative pulse on the first grid will cut the tube off, while at other times the tube can conduct.

Various modifications may be incorporated in the apparatus shown and described in the above embodiment without departing from the spirit of this invention. Any device which serves to slow or delay the motion of the light beam 19 as it traverses the web 17 immediately adjacent its lateral edges will serve to provide the better resolution of the decrease-output pulses in the signal voltage output profile of the photo-multiplier tube 16. One such modification may be a prism substituted in the optical system for the mirror 14. The prism would be inserted in such manner and would have such characteristic as to enable the light beam 19 to cause the light spot to normally proceed across the central area of the web 17 but by bending the rays of the light beam 19 momentarily near the lateral edges of the web, it would stop the spot on the edges of the web 17. After this slight delay, the beam 19 would proceed off the web 17. A signal output profile identical with Figs. 8 and 9 may be provided by this modification. It is also possible that the same or a similar result might be achieved by a timed movement of the mirror 14.

Further modifications may relate to the means for forming the beam 19, as described in connection with the above embodiment, a source of light and rotary apertured disc may be used. This disc may be substituted by any mechanism which produces a relatively narrow beam of light traversable across a mirror, such as the mirror 14, or a similar apparatus in close spaced sequence so as to provide the scanning effect described above. The basic concept of this invention is the apparent extension of the lateral edges of the web 17 as reflected in the voltage response of the photo-multiplier tube.

This invention provides means for the photo-sensitive scanning of tabulating card stock with a higher power of resolution and a greater sensitivity for minor and minute imperfections within the card stock. Imperfect areas are disclosed by the apparatus and the method of this invention, which are close to the edge of the stock and yet are undesirable because they are unattractive or cause structural weakness or cause a discontinuity or some other defect in the ultimate tabulating card. Further, this invention provides an easier means for interpretation of the reported results. It will be readily understood that the above described embodiment is set forth for the purpose of illustration only and that it is intended that the invention be limited solely by the scope of the appended claims.

What is claimed is:

1. In a device for detecting light and dark areas on the surface of a moving web in combination, means for producing a light beam scannable across a surface of said moving web, a photo-multiplier for receiving light reflected from said surface to produce an output characteristic of the modulation of said reflected light caused by said light and dark areas of said surfaces, means for directing said light beam on to said surface, a first area of said directing means directing said beam on said surface at a first rate of movement and curved second areas of said directing means directing said beam on said surface at a second and different rate of movement of said beam whereby said directing means varies the rate of motion of said beam across said light and dark areas and the rate of reporting said light and dark areas by activation of said photo-multiplier tube by the reflection of said movable beam.

2. A defect detecting device which comprises means for moving a strip of material, means for producing a light beam scannable laterally across a surface of said moving strip material, a photo-sensitive device receiving light reflected from said surface for detecting differences in reflectivity of said light on said surface, means for reporting said detected reflectivity differences, means directing said laterally moving scanning light beam on to said strip surface, a flat first sector of said directing means directing said beam on said strip surface at a first rate of lateral movement and curved second sectors of said directing means directing said beam on said strip at a second and different rate of lateral movement whereby the rate of lateral movement of said light beam across said strip surface and the reporting of detected reflectivity differences are varied.

3. In a defect detecting device, the combination of means for moving a strip of material, means for producing a light beam scannable laterally across a surface of said moving strip, a first photo-sensitive device for receiving light reflected from said surface for detecting differences in reflectivity of said light on said surface, means for reporting said detected reflective differences by producing an output characteristic of the activation caused by the reflection from said light and dark areas of said surface, a main mirror for directing said laterally moving scanning light beam on to said strip, a flat sector of said mirror directing said beam on said strip at a first uniform rate of lateral movement, curved sectors of said mirror directing said beam on said strip at a second and varied rate of lateral movement, a blanking mirror positioned lateral to said main mirror and strip receiving said light beam as it passes beyond said main mirror whereby said light beam produces reference pulses in said reporting means as it passes beyond said main mirror to said blanking mirror, a second photo-sensitive device for receiving said beam reflected from said blanking mirror so constructed and arranged that said photo-sensitive device is activated to produce an output in said reporting means defining said reference pulses.

4. The device of claim 2 in which said photosensitive device comprises a photo-multiplier tube and an amplifying and shaping circuit connected to the output of said tube.

5. The device of claim 2 in which the means for producing a light beam scannable across a surface of said moving strip of material comprises an apertured rotary disc and a light source positioned to project light rays through the apertures of said disc.

6. The device of claim 2 in which the means directing the laterally moving scanning light beam onto the strip surface comprises a mirror having a flat central sector thereof having an axes normal to the direction of the longitudinal motion of the moving strip which sector directs said light against the strip surface at a uniform rate of lateral movement upon scanning one portion of the surface of the web, and curved sectors at each end of said flat central sector which direct said light beam against the strip at a varied rate of lateral movement upon scanning the edge portions of the strip surface.

7. A defect detecting device for moving webs of material which comprises means for moving a web of material, a light source, rotatable means associated with said light source for directing a beam of light laterally across a surface of said moving web, a photosensitive device adapted to receive light reflected from said web surface for determining differences in reflectivity of said light from said surface, means for manifesting said detected reflectivity differences, optical means for directing said laterally moving light beam against said web surface, a central sector of said directing means being adapted to direct said beam across said web surface at a first rate of lateral movement and second sectors of said directing means located at each end of said first central sector in substantial alignment with opposite edges of said moving web for directing said beam across said web at said lateral edges at a rate of lateral movement that is less than said first rate of lateral movement whereby the rate of lateral movement of said light beam across said entire web surface and the manifestations of detected reflectivity differences are varied.

References Cited in the file of this patent

UNITED STATES PATENTS

| | | |
|---|---|---|
| 1,114,559 | Weed | Oct. 20, 1914 |
| 1,643,420 | Porter | Sept. 27, 1927 |
| 1,869,456 | Bausch | Aug. 2, 1932 |
| 2,395,482 | Hurley | Feb. 26, 1946 |
| 2,547,623 | Cockrell | Apr. 3, 1951 |
| 2,554,933 | Wouters | May 29, 1951 |
| 2,606,294 | Hagan | Aug. 5, 1952 |
| 2,610,303 | Bell | Sept. 9, 1952 |
| 2,719,235 | Emerson | Sept. 27, 1955 |